June 6, 1961 W. B. EDDISON ET AL 2,986,859
APPARATUS FOR APPLYING SEALS TO CONTAINERS
Filed April 1, 1959 9 Sheets-Sheet 1

INVENTORS.
WILLIAM BARTON EDDISON
WARREN E. ERICKSON
BY
Andrus & Starke
Attorneys June 6, 1961 W. B. EDDISON ET AL 2,986,859
APPARATUS FOR APPLYING SEALS TO CONTAINERS
Filed April 1, 1959 9 Sheets-Sheet 2

INVENTORS.
WILLIAM BARTON EDDISON
WARREN E. ERICKSON
BY
Andrus & Starke
Attorneys June 6, 1961 W. B. EDDISON ET AL 2,986,859
APPARATUS FOR APPLYING SEALS TO CONTAINERS
Filed April 1, 1959 9 Sheets-Sheet 3
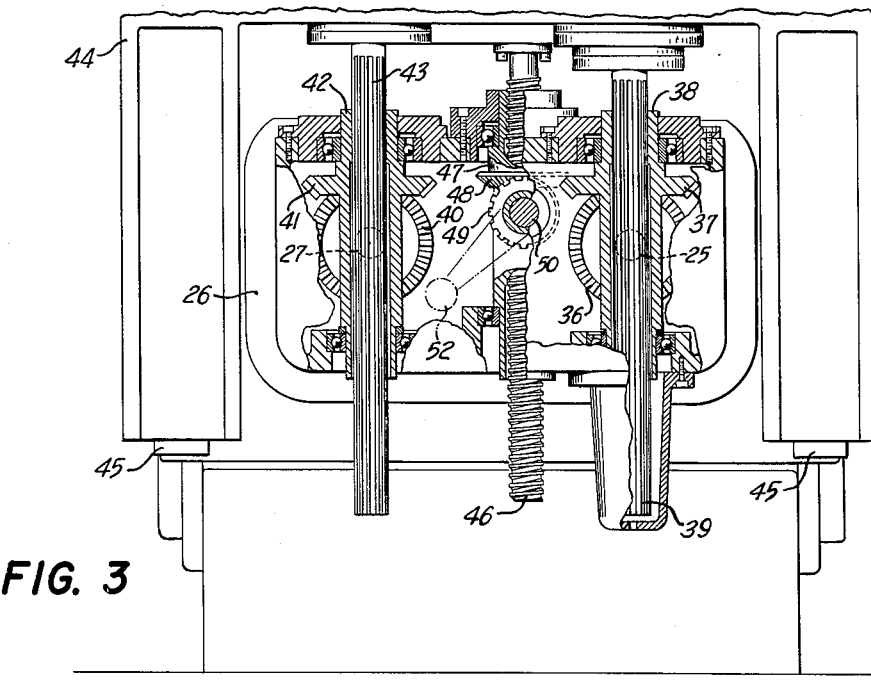
FIG. 3
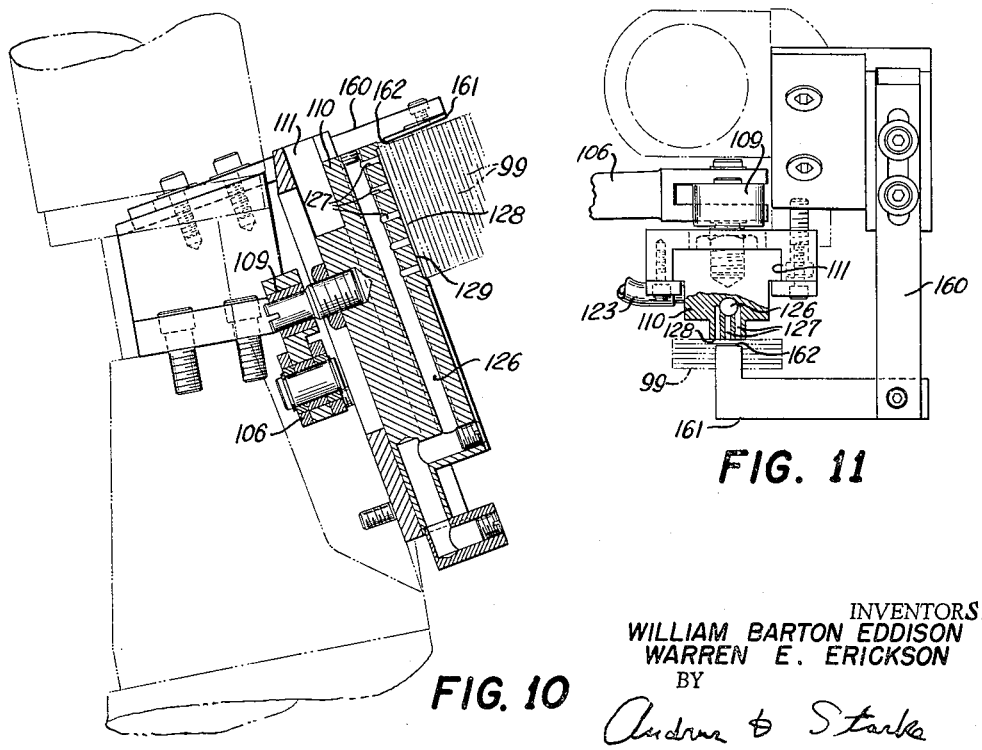
FIG. 10
FIG. 11
INVENTORS.
WILLIAM BARTON EDDISON
WARREN E. ERICKSON
BY
Andrus & Starke
Attorneys

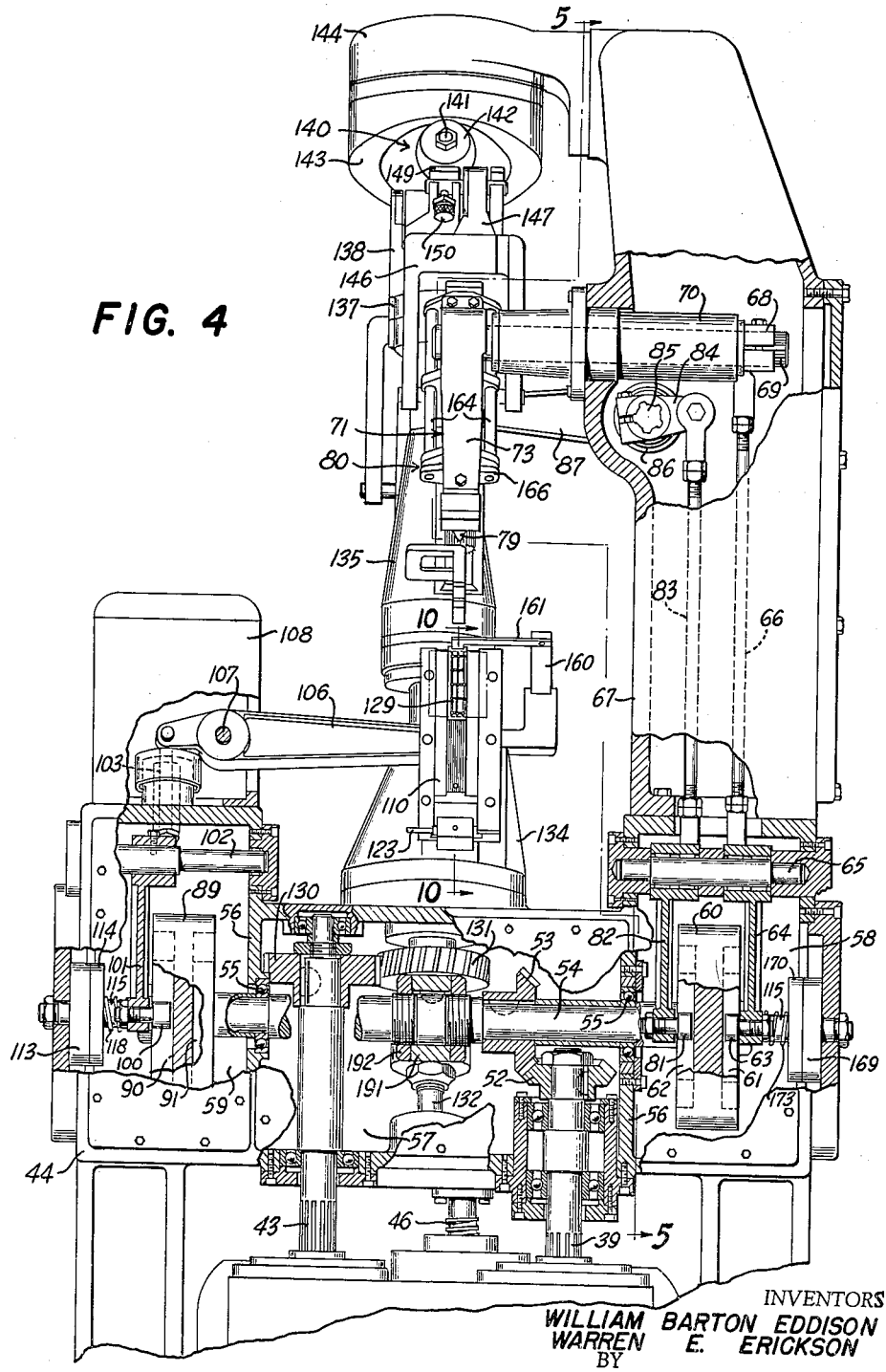

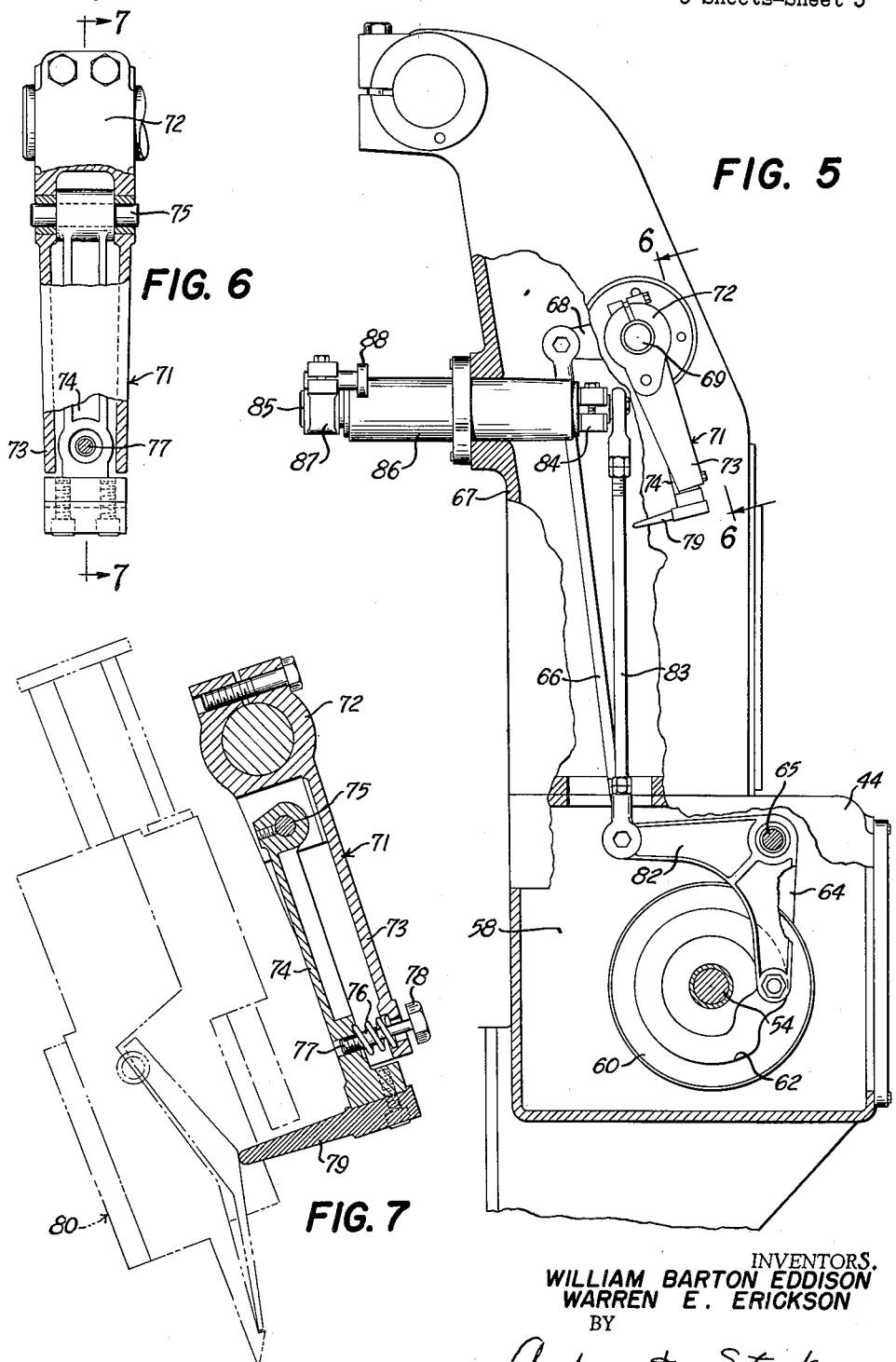

June 6, 1961     W. B. EDDISON ET AL     2,986,859
APPARATUS FOR APPLYING SEALS TO CONTAINERS
Filed April 1, 1959     9 Sheets-Sheet 6

INVENTORS.
WILLIAM BARTON EDDISON
WARREN E. ERICKSON
BY
Andrus & Starke
Attorneys June 6, 1961 W. B. EDDISON ET AL 2,986,859
APPARATUS FOR APPLYING SEALS TO CONTAINERS
Filed April 1, 1959 9 Sheets-Sheet 7
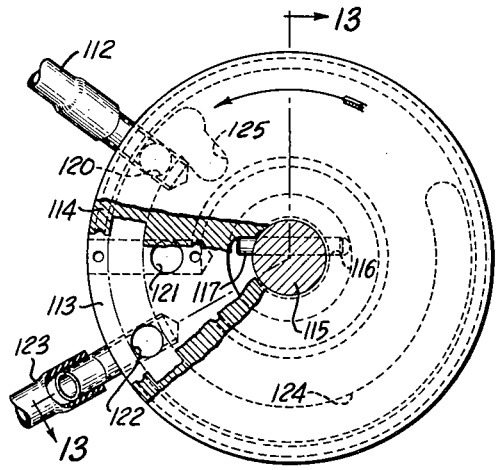
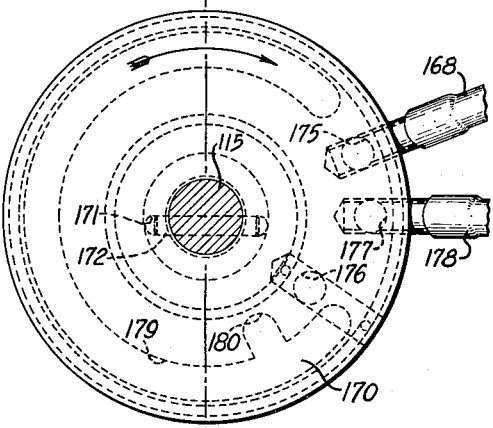
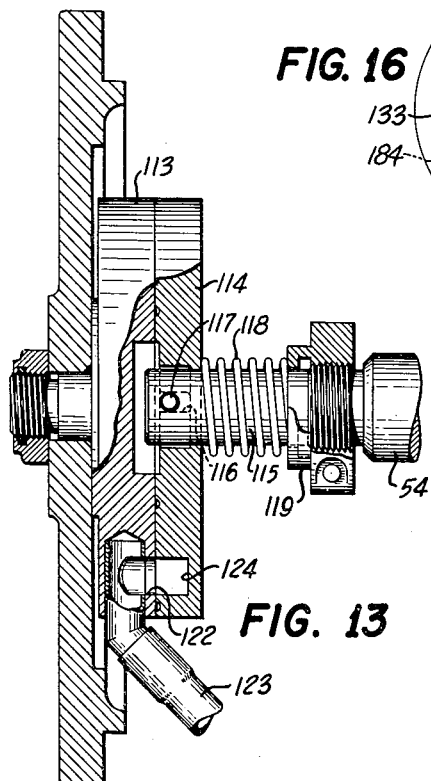
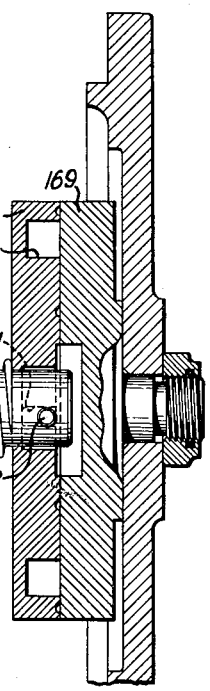
INVENTORS.
WILLIAM BARTON EDDISON
WARREN E. ERICKSON
BY
*Andrus & Starke*
Attorneys June 6, 1961 W. B. EDDISON ET AL 2,986,859
APPARATUS FOR APPLYING SEALS TO CONTAINERS
Filed April 1, 1959 9 Sheets-Sheet 8

INVENTORS.
WILLIAM BARTON EDDISON
WARREN E. ERICKSON
BY
Andrus & Starke
Attorneys United States Patent Office 2,986,859
Patented June 6, 1961

2,986,859
APPARATUS FOR APPLYING SEALS TO CONTAINERS
William Barton Eddison, Ardsley-on-Hudson, N.Y., and Warren E. Erickson, Madison, Wis., assignors to Gisholt Machine Company, Madison, Wis., a corporation of Wisconsin
Filed Apr. 1, 1959, Ser. No. 803,402
27 Claims. (Cl. 53—292)

This invention relates to an apparatus for applying seals or the like to containers, and more particularly to an apparatus for use in a bottling line for applying seals to capped bottles.

One of the most commercially successful machines for applying seals to capped bottles has been the one disclosed in United States Patent No. 2,835,088, granted to the present inventors on May 20, 1958, together with certain features thereof disclosed in patents and applications of the present inventors which are referred to in the above-mentioned patent.

The apparatus of the present invention is contemplated for use in connection with a machine such as that partially disclosed in the inventors' copending application entitled Machine for Handling Containers, Serial No. 803,406 filed on even date herewith. However, it may be possible to utilize the present apparatus in conjunction with a different handling apparatus.

In carrying out the invention, two separate rotary inputs are provided, one having a constant speed throughout a machine cycle and the other having an intermittent motion. The intermittent input is utilized to carry a plurality of heads into seal applying position at a fixed station, while the constant speed input is translated by a plurality of cams or the like into reciprocal motions for seal pickup and application. The entire apparatus is timed and synchronized to provide high speed, accurate operation.

The accompanying drawings illustrate the best mode presently contemplated by the inventors for carrying out the invention.

In the drawings:

FIG. 3 is a rear elevation of the connecting miter box with parts broken away and in section;

FIG. 4 is a rear elevation of the machine with parts broken away and in section;

FIG. 5 is a vertical section taken generally along line 5—5 of FIG. 4 and with parts removed and broken away for clarity;

FIG. 6 is a view taken along line 6—6 of FIG. 5 showing the spear-actuating finger, partially broken away;

FIG. 7 is a section taken along line 7—7 of FIG. 6;

FIG. 10 is a vertical section of the seal pickup apparatus taken along line 10—10 of FIG. 4;

FIG. 11 is a top plan view of the seal pickup apparatus, with parts broken away and in section;

FIG. 12 is an enlarged elevation of the valve at the left end of the cam shaft in FIG. 4, with parts broken away and in section;

FIG. 13 is a section taken generally on line 13—13 of FIG. 12;

FIG. 14 is a view similar to FIG. 12 of the valve at the right end of the cam shaft in FIG. 4;

FIG. 15 is a vertical section taken generally on line 15—15 of FIG. 14;

FIG. 16 is a generally horizontal section of the vacuum shunting distributor taken on line 16—16 of FIG. 8;

Figure 1:
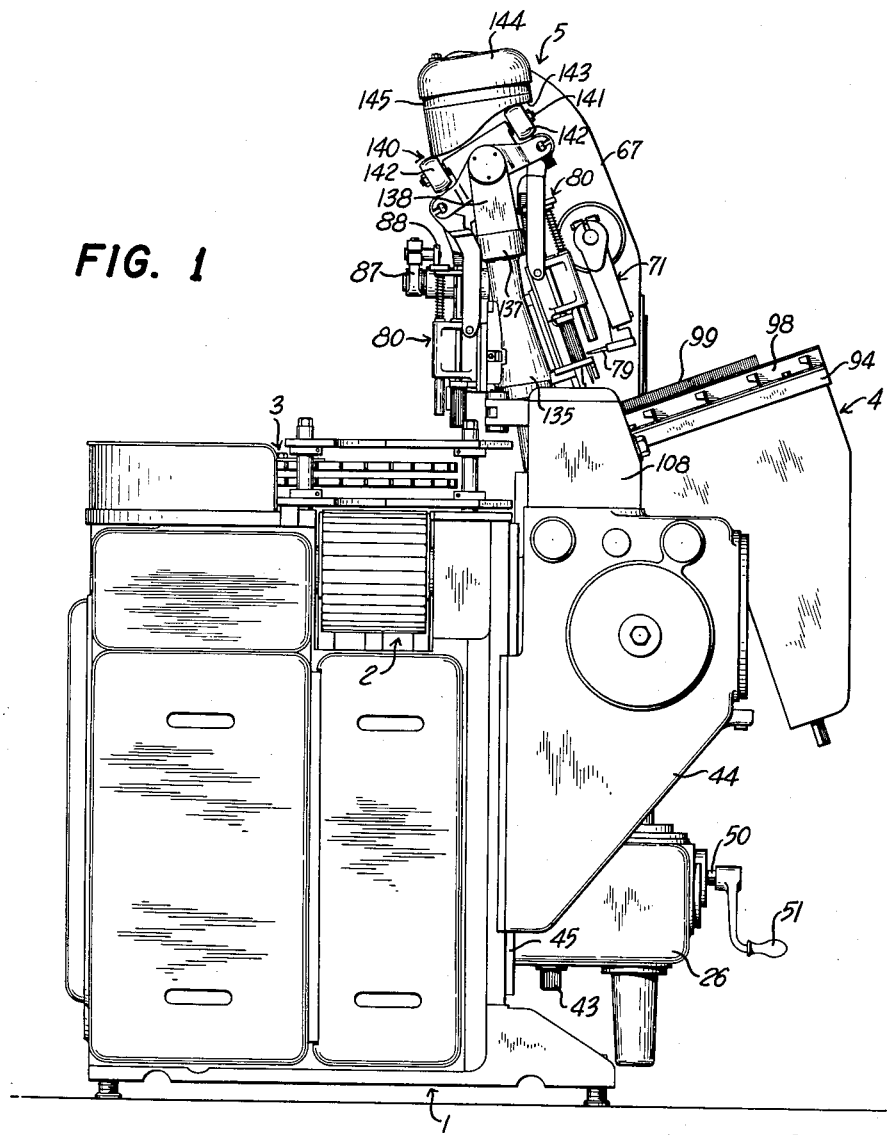
FIG. 1 is a side elevation of a machine embodying the apparatus of the invention.

As shown in the drawings, the seal applying apparatus is adaptable for use in a machine having a frame 1 which supports the drive mechanism, a longitudinal conveyor 2, and a circular table assembly 3 for carrying a stream of bottles in intermittent fashion to and from the seal applier. The machine carries a seal magazine feed apparatus 4, and the seal applying mechanism indicated generally at 5.

Figure 2:
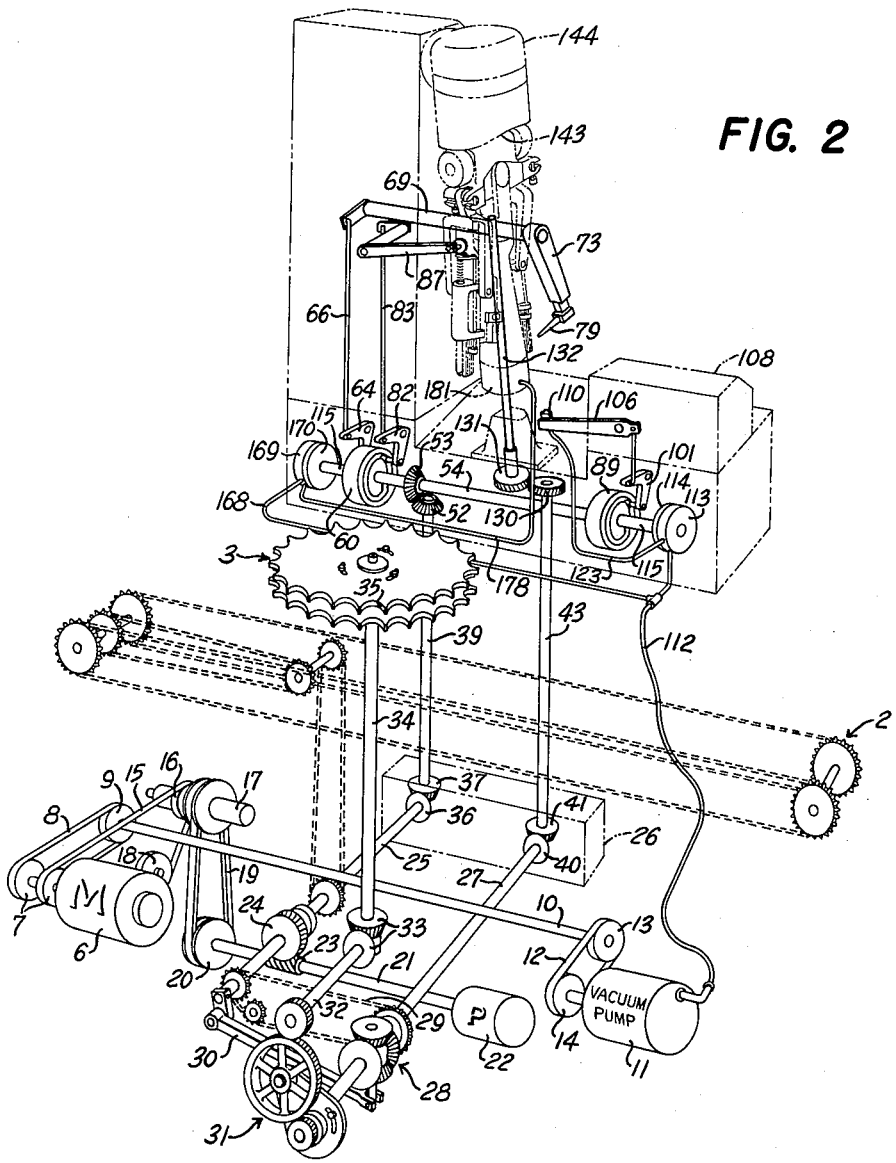
FIG. 2 is a generally schematic front view of the mechanism of the machine, and showing the vacuum lines.

As shown schematically in FIG. 2, the machine drive mechanism comprises an electric motor 6 of any suitable well-known type carried within and by frame 1 and adjacent one end thereof and having a dual groove sheave 7 mounted for rotation with the longitudinally extending motor output shaft. A belt 8 is mounted in one of the grooves of sheave 7 and extends rearwardly for driving engagement with an intermediate sheave 9 keyed to the outer end of a longitudinal drive shaft 10. The output of shaft 10 drives a vacuum pump 11 of any suitable well-known type, and comprises a belt 12 which drivingly connects a sheave 13 on the inner end of shaft 10 and a similar sheave 14 carried by the input shaft of pump 11.

Pump 11 is utilized to produce a vacuum for seal applying purposes as will be described hereinafter.

The second groove of motor sheave 7 is also provided with a belt, indicated at 15, which extends rearwardly to the input sheave 16 of the machine's main drive clutch 17, mounted on frame 2.

A suitable tensioning device is provided for belt 15, and comprises an auxiliary sheave 18 mounted on a take-up plate carried by the machine frame.

Clutch 17 is of the variable speed type, and is described in detail in the inventors' above-mentioned copending application. The clutch makes it possible to selectively vary the speed of the machine, and even stop it, without shutting off motor 6.

The output of clutch 17 comprises a drive belt 19 which extends downwardly to a sheave 20 secured on the outer end of a longitudinal worm shaft 21, the latter driving a suitable lubricating oil pump 22.

Worm shaft 21 is driven at a constant speed from motor 6 when clutch 17 is in a given position, and is provided with a worm 23 thereon which meshes with a worm gear 24 loosely mounted on the central portion of a transversely extending constant speed main output shaft 25.

Shaft 25 is directly driven from shaft 21 through a suitable slip-type safety clutch disposed thereon and normally disposed in driving engagement with gear 24. The rear end portion of shaft 25 passes rearwardly into a miter box 26 carried at the rear of the machine and connects to the bottle sealing apparatus, as will be described hereinafter.

The bottle conveyor 2 is driven from shaft 25 by a chain and sprocket drive described more fully in the inventors' above-mentioned copending application.

Shaft 25 is disposed generally between clutch 17 and another transverse shaft 27 which is adapted to be driven intermittently by a differential drive 28 mounted thereon.

The details of differential 28 are also disclosed in the inventors' above-mentioned copending application. A constant speed input is provided to differential 28 by a chain 29 drivingly connected to shaft 25. This constant speed input is combined with the oscillating motion of a crank 30 on shaft 25 to alternately speed up and slow down the rotation of shaft 27. The construction is such that shaft 27 rotates through 180° and then dwells for an instant, the time ratio of rotation to dwell being about five to one. For each 180° turn of shaft 27, shaft 25 makes one complete revolution.

Shaft 27 also extends rearwardly into miter box 26 and connects to the bottle sealing apparatus, as will be described hereinafter.

Table assembly 3 is driven in synchronism with the intermittent motion of shaft 27 through a gear train 31, horizontal shaft 32, bevel gears 33, and vertical table shaft 34. As bottles move along conveyor 2, they are fed into pockets 35 in the table wheel and carried intermittently to a station for application of seals. The dwell of shaft 27 is such that the table wheel dwells each time a bottle is at the sealing station.

As shown in FIGS. 2 and 3, the rear end portion of constant speed shaft 25 is provided with a bevel gear 36 which meshes with a bevel gear 37 forming part of a vertical sleeve 38 mounted for rotation in miter box 26. Sleeve 38 is fixed against vertical movement and is splined at its upper end portion to receive a vertically extending splined shaft 39 which passes through the sleeve.

In similar fashion, the rear end portion of the intermittent shaft 27 is provided with a bevel gear 40 which meshes with a bevel gear 41 forming part of a vertical sleeve 42 mounted for rotation in miter box 26. Sleeve 42 is fixed against vertical movement and is splined at its upper end portion to receive a vertically extending splined shaft 43 which passes through the sleeve.

Splined shafts 39 and 43 extend upwardly from miter box 26 and into a relatively large housing 44 which carries the major portion of the seal handling and applying apparatus. It is desirable that housing 44 be adjustable so that seals are vertically positioned properly in relation to the bottle tops. For this purpose, housing 44 is slidably mounted on vertical tracks 45 secured to the outer wall of frame 1. Adjustment of housing 44 on tracks 45 is provided by a large threaded jack screw 46 which is fixedly secured to the base of the housing and which extends downwardly into miter box 26. Within box 26, screw 46 is threadably received by a vertically extending threaded sleeve-like nut 47 which is connected to a bevel gear 48, the latter meshing with a bevel gear 49 on the inner end of a horizontal crank shaft 50. The outer end of shaft 50 extends through the wall of box 26, and is provided with a manually operable crank 51 disposed thereon.

Turning of crank 51 will rotate shaft 50 and thus nut 47 to raise and lower jack screw 46 and housing 44, and also shafts 39 and 43.

The upper end of shaft 39, within housing 44, is provided with a bevel gear 52 which meshes with a bevel gear 53 keyed to the central portion of a horizontally extending cam shaft 54. As best shown in FIG. 4, shaft 54 is rotatably mounted in bearings 55 disposed in a pair of spaced inner wall portions 56 of housing 44. Walls 56 divide the housing into a central chamber 57 and two end chambers 58 and 59. Shaft 54 extends through bearings 55 into chambers 58 and 59.

An annular cam 60 is fixedly disposed on shaft 54 within chamber 58 and provides a motivating control for seal handling. For this purpose a generally circular cam track or groove 61 is disposed on the outer face of cam 60, and a second cam track or groove 62 is disposed on the inner face thereof.

Cam groove 61 controls the operation of a roller type cam follower 63 disposed therein, with follower 63 being mounted at one end of a right angle lever 64 pivoted on a shaft 65 (FIGS. 4 and 5). The other end of lever 64 is pivotally secured to a connecting rod 66 which extends upwardly within a vertical extension or head portion 67 of housing 44. The upper end of rod 66 is pivotally connected through a link 68 to a horizontal shaft 69 disposed for rotation in a suitable sleeve 70 which passes outwardly through head 67.

A seal mandrel spear control assembly 71 (FIGS. 5, 6 and 7) is mounted on the outer end of shaft 69 and comprises a clamp bracket 72 for securing the assembly on the shaft. Extending downwardly from bracket 72 is a channel-shaped housing 73 which carries a lever 74 therewithin, the latter being pivotally mounted at its upper end on a shaft 75 and biased outwardly of the housing at its lower end by a spring 76. The spring is mounted on a bolt 77 passing through the housing wall and threadably received by the lever. Outward pivoting of lever 74 is limited by the head 78 of bolt 77 which acts as a stop.

A transversely extending finger 79 is disposed on the lower end of lever 74 and is adapted to engage a seal pickup and applying mandrel assembly 80 in response to rotation of cam 60, as will be described hereinafter.

Cam groove 62 controls the operation of a second roller type cam follower 81 disposed therein, with follower 81 being mounted at one end of a second lever 82 also pivoted on shaft 65. The other end of lever 82 is pivotally secured to a second connecting rod 83 which also extends upwardly through head 67. The upper end of rod 83 is connected through a link 84, disposed at right angles to link 68, to a horizontal shaft 85 disposed for rotation in a suitable sleeve 86 which passes outwardly through head 67 at right angles to sleeve 70.

A seal stripper arm 87 is clamped to the outer end of shaft 85 and is adapted to oscillate in response to rotation of cam 60. A suitable roller-like member 88 of nylon or the like is mounted at the outer end of arm 87 to engage mandrel assembly 80, as will be described.

Chamber 59 houses a second cam member 89 which also controls seal handling. For this purpose, a generally circular cam track or groove 90 is disposed on the outer face of cam 89, and a second cam track or groove 91 is disposed on the inner face thereof.

Cam groove 90 controls the pickup operation from seal magazine assembly 4 which is generally similar to that shown in the present inventors' United States Patent No. 2,794,636. Assembly 4, shown best in FIGS. 8 and 9, comprisess a channel-like frame 92 secured centrally of housing 44 on a base 93 and a tilt table 94 supported on the frame by means of flexible plates 95 which provide for free floating of the table in a lateral direction only.

An electromagnetic vibrator 96 is disposed on frame 92 beneath table 94 to give a rapid lateral vibration of the table, as described in Patent No. 2,794,636. Springs 97 are disposed between suitable brackets in the mechanism to determine the natural frequency of vibration for the table within the range of frequency of vibrator 96.

Table 94 supports a magazine storage trough 98 thereon for containing packs of flat folded cellulose cut seals 99. The trough is open topped for ready replenishing of seals therein by the operator, and tilts downwardly at an acute angle from the horizontal for delivery of successive seals to mandrel assembly 80.

For purposes of seal pick-off from the end of trough 98, a roller-type cam follower 100 (FIG. 4) is disposed in cam groove 90, with the follower being mounted at one end of a lever 101 pivoted on a shaft 102. The other end of lever 101 is pivotally secured to a rod 103 which is adjustably threaded into one end of a tubular link 104 which passes upwardly through housing 44. A similar rod 105 is adjustably threaded into the other end of link 104, and is pivoted at its outer end to the inner end of a lever arm 106. Arm 106 is centrally mounted on a pivot shaft 107 carried by a wall portion 108 of housing 44. The outer end of arm 106 is connected through a link 109 to a slideable insert member 110 (FIGS. 4, 10 and 11) mounted for generally vertical reciprocating movement on a track 111 carried on the machine.

Insert 110 is disposed to face the end of the pack of seals 99 and to pick each end seal off, one at a time. For this purpose, a timed vacuum is provided on the insert face in the following manner.

A vacuum line 112 extends from the constantly operating vacuum pump 11 to an annular base plate 113 (FIGS. 4, 12 and 13) which is fixedly mounted to a retainer plate on the wall of housing 44 and within chamber 59. Plate 113 is disposed in axial alignment with the axis of the constantly rotating cam shaft 54. The inner face of base plate 113 is adapted to receive the face of a similar annular valve member 114 which is mounted on one of the reduced end portions 115 of shaft 54.

Valve 114 is provided with a central opening for receiving end portion 115, and has a longitudinal slot 116 in the opening for receiving a locking pin 117 in end portion 115. Pin 117 prevents rotation of valve 114 relative to shaft 54. However, slot 116 permits limited axial shifting of the valve on the shaft so that it may be biased firmly against plate 113 by a spring 118. Spring 118 is mounted between valve 114 and a collar 119 threaded on shaft 54.

Vacuum line 112 connects through a chamber in base plate 113 to an opening 120 in the face of the latter. A second opening 121 is disposed in the face of plate 113 slightly counterclockwise from opening 120 and on a smaller radius. Opening 121 connects through a chamber in plate 113 which vents to the outside, for purposes to be described. A third opening 122 is disposed counterclockwise from opening 121 and on the same radius as opening 120 and connects through a chamber in plate 113 and a line 123 to the lower end portion of insert 110.

The vacuum connection is made between openings 120 and 122 by an arcuate groove 124 in the face of valve 114 which lies on the same radius as the outer two openings. At certain times it is desirable to vent the vacuum in line 123 through opening 121. For this purpose, the clockwise end of groove 124 is provided with a radially inwardly extending portion 125 adapted to connect with the vent opening.

Line 123 connects with a chamber 126 in insert 110 which extends upwardly therein and which connects at the upper end portion with a plurality of small vacuum openings 127 in the narrow face portion 128 of the insert. If desired, openings 127 may be interconnected by a plurality of grooves 129 to spread the vacuum effect.

Face portion 128 is centrally located on the inner wall of insert 110 and is substantially narrower than the width of a seal 99 presented thereto.

Operation of the vacuum pickoff apparatus is as follows: At the start of a pickoff cycle, cam follower 100 is in that portion of cam groove 90 so that insert 110 is lowered with openings 127 closely adjacent the end seal 99 of the magazine. Valve 114 is rotatably disposed so that either none of openings 120, 121 and 122 are in communication with groove 124, or only opening 120 is.

As cam shaft 54 rotates, insert 110 will at first remain in the lowered position, cam groove 90 having a rather long portion of same radius. Finally, valve groove 124 will connect openings 120 and 122 to provide a vacuum at face 128 which will pull the central vertical portion of the end seal 99 against the face and hold it there. Upon further rotation of shaft 54, follower 100 will enter a gradual rise in cam groove 90, causing insert 110 to be temporarily raised above the level of trough 98, carrying a single seal with it for presentation to mandrel assembly 80. Upon application of the seal 99 to assembly 80, and as shaft 54 continues to rotate, the counterclockwise end of groove 124 will disconnect from opening 120, removing the vacuum from pump 11. Any vacuum trapped in groove 124 or line 123 will be removed subsequently when groove portion 125 communicates with vent opening 121.

Cam groove 91 may be provided to facilitate operation of any desired auxiliary equipment, such as a bottleneck clamping apparatus, not shown. Apparatus of this general type is disclosed in the present inventors' United States Patent No. 2,835,088.

Figures 8, 9, 20:
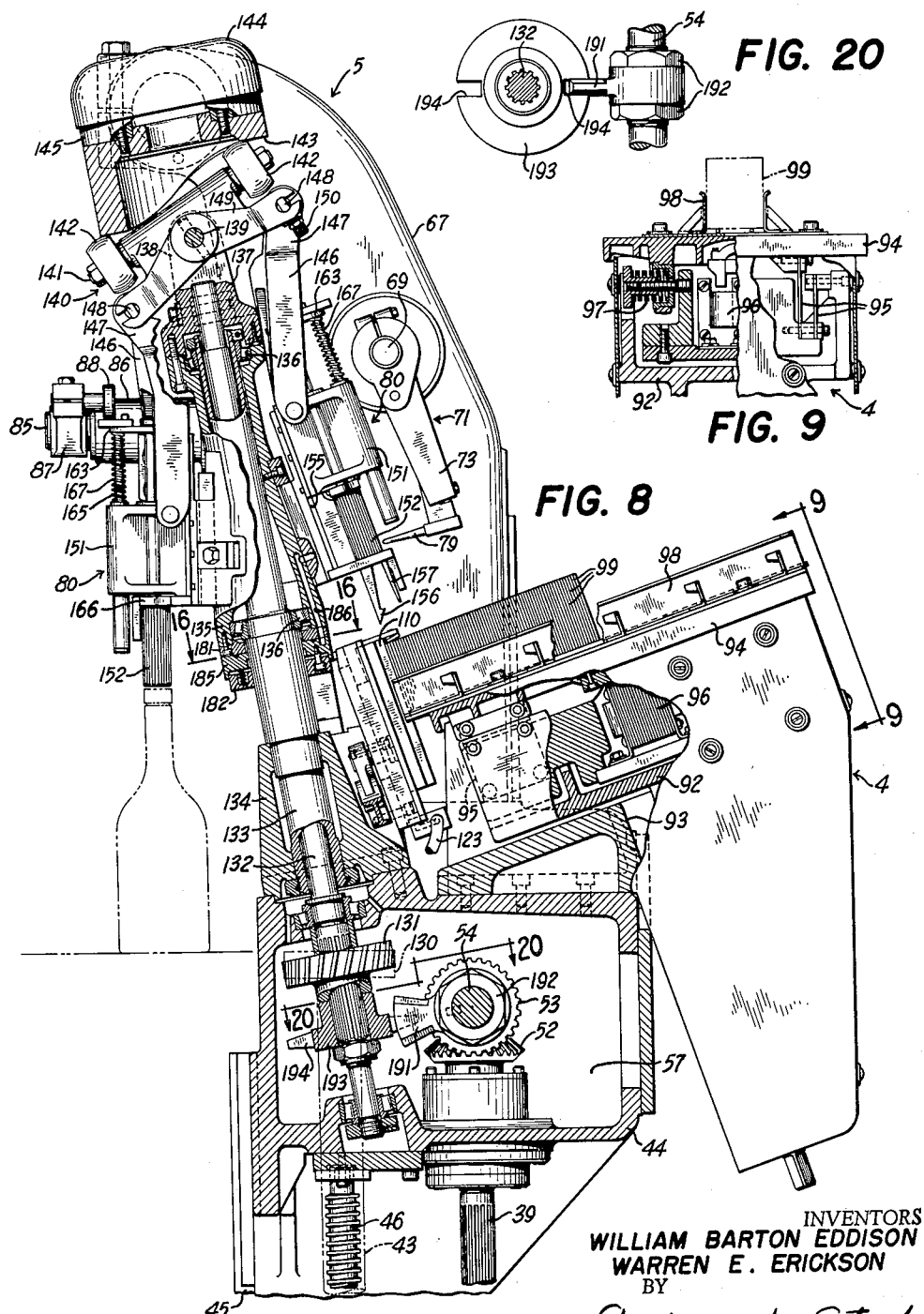
FIG. 8 is an enlarged fragmentary side elevation of the seal handling apparatus shown in FIG. 1, with parts broken away and removed and in section.
FIG. 9 is an end elevation of the seal magazine feed assembly taken generally along line 9—9 of FIG. 8, with parts broken away and in section.
FIG. 20 is a view of the timing device, taken on line 20—20 of FIG. 8.

As mentioned previously, the splined intermittently rotating shaft 43 extends upwardly from miter box 26 into housing 44. The upper end of shaft 43 is secured for rotation adjacent the roof of the housing. As best shown in FIGS. 4 and 8, a helical gear 130 with teeth slightly offset from the vertical is keyed to shaft 43 within housing 44, gear 130 being disposed in meshing engagement with a similar helical gear 131 on an upwardly extending drive shaft 132.

The lower end of shaft 132 is mounted for rotation adjacent the floor of housing 44, and extends upwardly with its axis disposed at a slight tilt from the vertical; that is, at an acute angle therefrom. Shaft 132 passes out of the housing and through a fixed supporting sleeve 133, with both the shaft and sleeve extending a substantial distance thereabove. The lower end portion of the shaft and sleeve assembly is additionally supported by a relatively heavy pedestal 134 bolted to the housing roof adjacent the lower end of seal magazine feed apparatus 4.

A generally tubular column 135 is concentrically disposed and supported for rotation about sleeve 133 by a plurality of spaced bearings 136 mounted on suitable shoulders on the sleeve. Column 135 is connected for rotation with drive shaft 132 by a cradle 137 which is bolted to the top of the column and which fixedly receives the upper end of shaft 132 therein.

A pair of diametrically opposed arms 138 extend upwardly from the base of cradle 137, the upper ends of the arms supporting a rocker shaft 139 extending therebetween and rotatably mounted therein. Shaft 139 rotatably supports a rocker assembly 140 having a pair of arms extending outwardly in opposite directions and radially of the shaft. The upper portion of assembly 140 houses a roller pin 141 therein which extends parallel to the rocker arms. Each end of pin 141 carries a rocker roller 142 rotatable thereon.

Rocker assembly 140 is adapted to be rocked on shaft 139, as column 135 rotates, in response to the following action of rollers 142 on a downwardly facing inclined circular cam 143 secured to a suitable bracket 144 mounted adjacent the upper portion of head 67. If desired, suitable spacers 145 may be positioned between cam 143 and bracket 144 to provide the proper contact between the cam and rollers.

The rocking action of assembly 140 is utilized to actuate a pair of opposed mandrel assemblies 80, which alternately receive a seal 99 from magazine feed apparatus 4 and apply it to a bottle carried by table assembly 3.

Assembly 80 is shown as being similar to that disclosed in the copending application of Arden L. Salzwedel, Serial No. 803,438, entitled Mandrel Assembly for Seal Applying Machine, filed on even date herewith and assigned to a common assignee.

Figure 17:
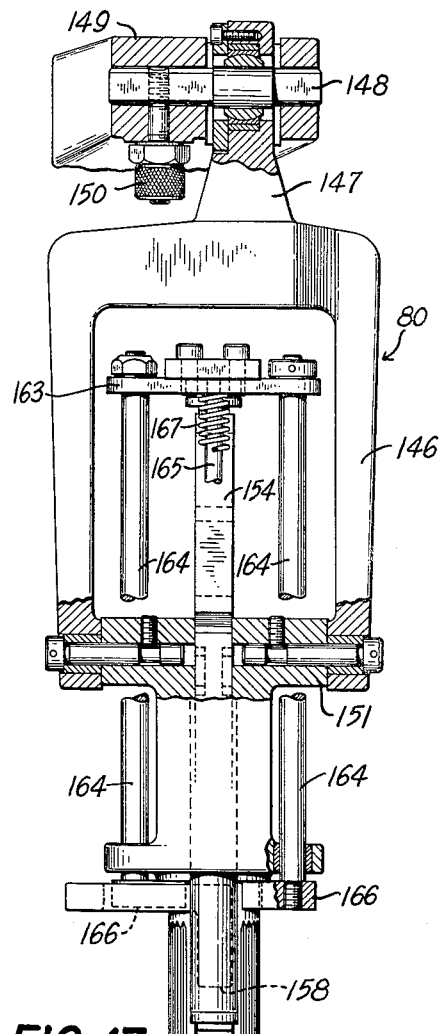
FIG. 17 is a front elevation of one of the seal mandrel assemblies with the mandrel down and with parts broken away and in section.
Figure 18:
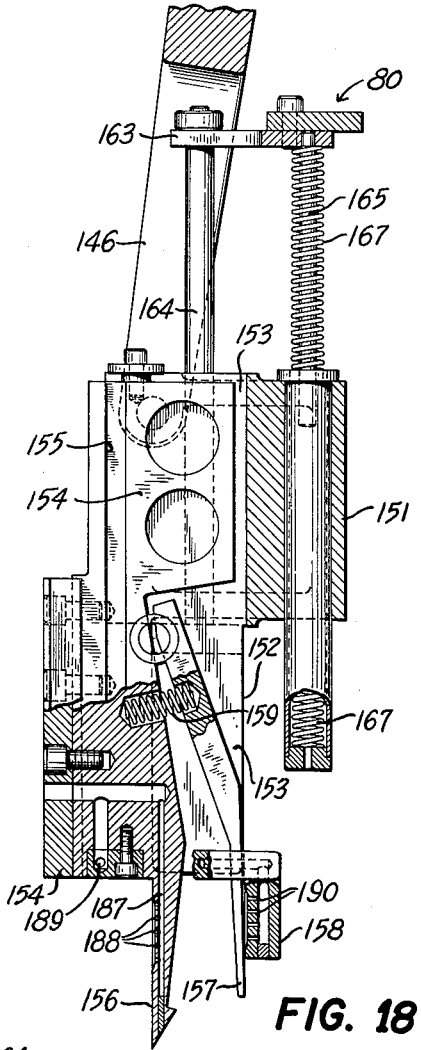
FIG. 18 is a left side elevation of the mandrel assembly of FIG. 17, with parts broken away and in section.
Figure 19:
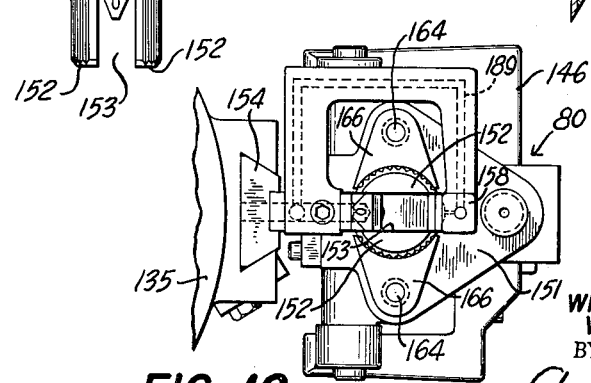
FIG. 19 is a bottom plan view of the mandrel assembly.

As best shown in FIGS. 17, 18 and 19, each mandrel assembly 80 comprises, generally, a yoke 146 having an upper arm 147 which carries one end of a connecting rod 148 in a suitable self-aligning bearing. The other end of rod 148 is fixedly secured in a slot in the end of a rocker arm 149 by a stud 150 extending therethrough.

The lower arms of yoke 146 pivotally connected with the upper end portion of a housing 151 which carries a downwardly extending mandrel 152 on its lower end. A relatively large slot 153 extends downwardly through the entire housing and mandrel, thus dividing the latter into two spaced segments.

Slot 153 receives a finger assembly 154 therein which is mounted on the outer wall of column 135. Assembly 154 includes a grooved track 155 on which housing 151 is adapted to ride. A spear 156 is mounted at the lower end of assembly 154 and is adapted to be received in one side of slot 153. A finger 157 is also carried by assembly 154 and is normally disposed at the other side of the slot in opposing relation to spear 156. Finger 157 is pivotally biased outwardly against a fixed arm 158 by a suitable spring 159.

As column 135 turns, one of the mandrel assemblies will approach magazine apparatus 4, and cam 143 will cause the respective rocker arm 149 to raise housing 151 to its uppermost position, exposing spear 156 and the lower end portion of finger 157. When spear 156 reaches a position above vacuum insert 110 of magazine assembly 92, the entire column 135 will dwell momentarily, as determined by the control of shaft 43 by differential 28. The apparatus is coordinated and timed so that a dwell is simultaneously provided for table 3 so that a bottle is presented directly beneath the opposite mandrel.

Substantially at the moment of dwell, finger 79 of spear control assembly 71 will be pivoted against the exposed vertical face of finger 157 to push the latter against spear 156 to form a single seal engaging unit. The spring biasing of finger 79 assures firm contact with finger 157, while permitting a certain amount of play in the mechanism. The vacuum will now have been applied to vacuum insert 110 and the latter will be raised to pull the end seal upwardly from the magazine.

Only a single seal can be removed from the trough 98 at any given time because of a restriction provided by a retainer mounted on pedestal 134. This restriction comprises a bracket 160 (FIG. 11) bolted to the pedestal and adjustable in a direction parallel to trough 98. A retainer arm 161 extends laterally from the end of bracket 160 and has a blunt edge portion 162 spaced from insert face 128 approximately the thickness of one seal 99. The portion of arm 161 adjacent edge 162 is disposed in hold-down engagement with the remaining seal pack.

As insert 110 rises, face 128 will extend in overlapping relation with the back of the spear unit, and the unopened seal will rise up over the unit to be partially opened thereby. Finger 79 will also pull away from finger 157, causing the latter to be biased outwardly to its initial position, thereby opening seal 99 so that it is generally circular. The vacuum will then be cut off from face 128, and vacuum applied to the spearing mechanism as will be described.

After the dwell, column 135 will rotate 180° to present the seal to a bottle. During this rotation insert 110 will be lowered to pick up the next seal from the magazine. Also during rotation, rocker arm 149 will lower mandrel 152 so that it envelops spear 156 and finger 157 in slot 153, thereby causing seal 99 to ride up on the outside of the mandrel.

As assembly 80 dwells over a bottle, the seal will be stripped downwardly from mandrel 152 onto the bottle top. This is accomplished by roller 88, which functions in response to cam groove 62, and which is lowered into engagement with a stripper plate 163 mounted on the upper ends of two stripper rods 164 and a shaft 165. Rods 164 extend downwardly through brackets on housing 151 with each rod supporting a seal stripper member 166 on its lower end. Members 166 are contoured to fit mandrel 152 so that as roller 88 forces plate 163 downwardly, the members will strip the seal off the mandrel.

Just before return of assembly 80 to the pickup position, roller 88 will rise, and stripper plate 163 and its associated elements will be forced upwardly to the initial position by a spring 167 on shaft 165 between housing 151 and plate 163.

As best shown in FIG. 8, column 135 is tilted from the vertical, since it is mounted on shaft 132. In addition, each mandrel assembly 80 mounted on column 135 is tilted from the axis of shaft 132. By this means, each mandrel 152 is tilted from the vertical when it is disposed adjacent tilted magazine feed 4, and is actually perpendicular to trough 98. In addition, when each mandrel is adjacent table assembly 3, it will be vertically positioned.

Mandrel assembly 80 is provided with a timed vacuum to hold a seal on the spear unit prior to its being placed on the mandrel 152. For this purpose a vacuum line 168 extends from line 112 to an annular base plate 169, similar to plate 113, which is fixedly mounted to a retainer plate on the wall of housing 44 and within chamber 58. Plate 169 is disposed in axial alignment with the axis of the constantly rotating cam shaft 54. The inward face of base plate 169 is adapted to receive the face of an annular valve member 170 which is mounted on the other reduced end portion 115 of shaft 54.

As best shown in FIGS. 4, 14 and 15, valve 170 is provided with a central opening for receiving shaft portion 115 and has a longitudinal slot 171 in the opening for receiving a locking pin 172 in portion 115. Pin 172 prevents rotation of valve 170 relative to shaft 54. However, slot 171 permits limited axial shifting of the valve on the shaft so that it may be biased firmly against plate 169 by a spring 173. Spring 173 is mounted between valve 170 and a collar 174 threaded on shaft 54.

Vacuum line 168 connects through a chamber in plate 169 to an opening 175 in the face of the latter. A second opening 176 is disposed in the face of plate 169 clockwise from opening 175 and on a smaller radius. Opening 176 connects through a chamber in plate 169 which vents to the outside. A third opening 177 is disposed between openings 175 and 176 and on the same radius as opening 175 and connects through a chamber in plate 169 to a line 178.

The vacuum connection is made between the three openings by an arcuate groove 179 in the face of valve 170 which lies on the same radius as the outer two openings. At certain times it is desirable to vent the vacuum in line 178 through opening 176. For this purpose, a radial groove extension 180 is provided and is spaced slightly clockwise from the counterclockwise end of groove 179.

Line 178 connects to mandrel assembly 80 to provide vacuum thereto. For this purpose an annular distributor 181 (FIGS. 8 and 16) surrounds sleeve 133 just below column 135. Distributor 181 is fixedly held in place by an annular load ring 182 clamped to sleeve 133. A segmental arcuate groove 183 is disposed on the upper face of distributor 181 and connects with line 178. Groove 183 is adapted to selectively connect the vacuum line with one of two diametrically opposed openings 184 in the face of a base plate 185 rotatably carried by the lower end of column 135 and against which distributor 181 is biased.

Each opening 185 connects with a longitudinal passage 186 in the wall of the column, the latter communicating therethrough into the respective finger assembly 154.

The finger assembly is provided with a passageway 187 which passes downwardly through spear 156 to a plurality of grooved openings 188 on the outer face of the spear. A second passageway 189 communicates through arm 158 and terminates in a plurality of grooved openings 190 on the inner face thereof.

Figure 21:
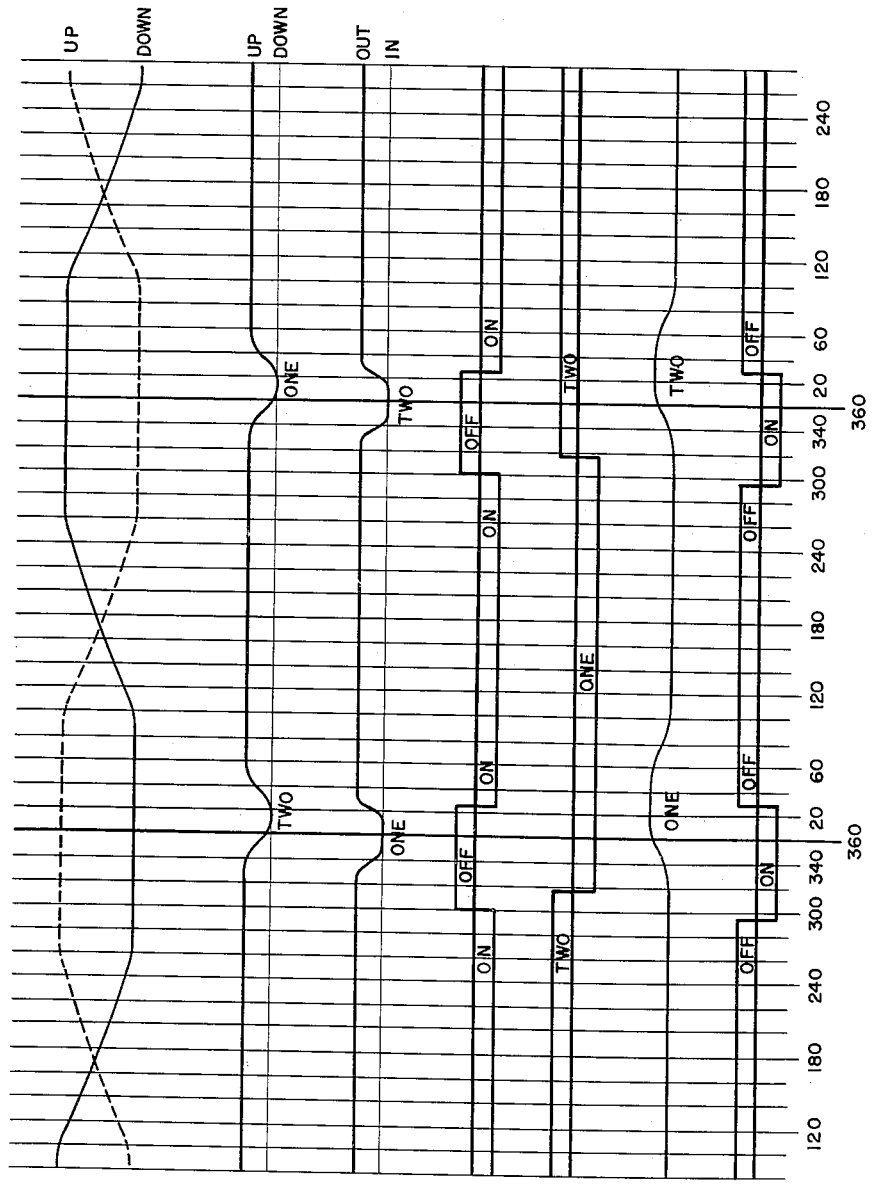
FIG. 21 is a diagrammatic layout of the machine cycle.

Operation of the spear vacuum control can best be described in connection with a complete cycle of the apparatus, which is diagrammatically shown in FIG. 21. The diagram actually plots the surfaces of cam grooves 61, 62 and 90 through two complete revolutions. The action of valves 114 and 170 are also shown through two revolutions. However, since shafts 25 and 54 make one complete revolution for every 180° turn of shafts 27 and 132, the diagram only shows one complete surface of cam 143 and one revolution of distributor 181.

The line markings show degree intervals for the rotating cams. The markings adjacent 360°, between 340° and 20°, indicate the general areas of dwell of the seal handling mechanism.

Starting with the first 180° line marking, mandrel one is moving toward magazine insert 110 and is rising. Finger 79 on lever 74 is in its retracted position, insert 110 is at its lowermost position, and the vacuum for insert 110 is off. At the same time, mandrel two with an applied seal thereon is moving toward table 3 and is lowering. Stripper arm 87 is at its top position, and the vacuum is on the spear 156.

Shortly after the mandrels reach their extreme vertical positions, valve 170 shuts off vacuum to mandrel two and distributor 181 switches the vacuum connection from the spear on mandrel two to the spear on mandrel one. In addition, valve 114 connects vacuum to insert 110, and the latter begins to rise in response to cam groove 90 and with a seal held thereon. Cam groove 61 then causes lever 74 to pivot to push finger 157 against spear 156, which occurs approximately at the beginning of the dwell.

Cam groove 62 then causes arm 87 to lower to begin to strip the seal off mandrel two.

During the dwell, finger 157 is held against spear 156 by finger 79, insert 110 is raised and the seal is being stripped from mandrel two.

As the apparatus moves to the end of the dwell, finger 79 gradually retracts to open finger 157. Insert 110 has reached the top of its stroke for mandrel one, the stripper on mandrel two has reached the bottom of its stroke and is returning upwardly. Valve 170 then reconnects the vacuum, which is now applied by distributor 181 to the spear on mandrel one to hold the seal thereon. Shortly thereafter, the vacuum for insert 110 goes off. Finger 79 becomes fully retracted again, and stripper arm 87 is again at its top position.

During the next 180° rotation, mandrel two raises and moves toward insert 110 and mandrel one lowers and moves toward table 3. The same cycle then is repeated, except that the opposed mandrels are in reverse position.

During each dwell, provision is made to insure exact positioning of the intermittently moving mechanism relative to the position of the vacuum insert 110. For this purpose, a radially extending arm or cam 191 is keyed on the central portion of cam shaft 54 and secured between two collars 192 (FIG. 20). Cam 191 cooperates with a positioning ring 193 fixedly mounted on intermittent shaft 132 adjacent shaft 54. A pair of diametrically opposed radial slots 194 extend through ring 193.

During operation of the apparatus, cam 191 rotates one full revolution on the axis of shaft 54 for every 180° of rotation of ring 193 about the axis of shaft 132. At the time of a dwell, slot 194 faces shaft 54 and cam 191 passes through the slot. At the next dwell, the cam will pass through the opposing slot.

The width of each slot 194 is such that cam 191 passes through them during dwell with the smallest possible clearance, thus momentarily preventing any rotary play in the intermittent mechanism.

The apparatus of the invention provides a synchronized, timed sequence of action for applying seals to capped bottles and the like. By using the combination of intermittent and constant speed inputs which both control the operation of cams and vacuum valves, great flexibility and relatively high speed is obtained.

Various modes of carrying out of the invention are contemplated as being within the scope of the following claims particularly pointing out and distinctly claiming the subject matter which is regarded as the invention.

We claim:

1. Apparatus for applying initially flat folded seals from a seal source onto containers, comprising, a first rotatable input shaft, a second rotatable input shaft, a plurality of seal applying assemblies connected for rotation by said second shaft, a seal pick-off member for removing seals from the seal source and applying them to said assemblies, a seal opening member disposed to engage said assemblies for opening seals disposed thereon, a seal stripper member disposed to engage said assemblies for stripping opened seals therefrom; and control means operated by rotation of said first input shaft to actuate said seal pick-off member, said seal opening member and said seal stripper member, in sequence.

2. The apparatus of claim 1 in which said control means comprises, a plurality of cams drivingly rotated by said first input shaft with the number of cams providing a cam for each of said members, a follower for each cam, and means connecting each said follower with one of the said members to operate the latter, the relative shape of said cams providing the sequential operation of the said members.

3. Apparatus for applying initially flat folded seals from a seal source onto containers, comprising, a constantly rotatable input shaft, an intermittently rotatable input shaft, a plurality of seal applying assemblies connected for rotation by said intermittently rotatable shaft, a seal pick-off member for removing seals from the seal source and applying them to said assemblies, a seal opening member disposed to engage said assemblies for opening seals disposed thereon, a seal stripper member disposed to engage said assemblies for stripping opened seals therefrom; and control means operated by rotation of said constantly rotatable input shaft to actuate said seal pick-off member, said seal opening member and said seal stripper member, in sequence.

4. The apparatus of claim 3 in which said control means comprises, a plurality of cams drivingly rotated by said constantly rotatable input shaft with the number of cams providing a cam for each of said members, a follower for each cam, and means connecting each said follower with one of the said members to operate the latter, the relative shape of said cams providing the sequential operation of the said members.

5. In apparatus for applying initially flat folded seals to containers moving on a transfer apparatus, a first shaft, a second shaft, a magazine disposed to present one seal at a time for pick-off; a plurality of seal applying assemblies rotatable by said second shaft and disposed to receive seals from said magazine, open them, and subsequently apply them to a container; a cam rotated by said first shaft, and pick-off means actuated by said cam for receiving a seal from said magazine and applying it to one of said assemblies; said pick-off means comprising, a lever actuated by said cam, and a pick-off member connected to said lever and slidable laterally of said magazine adjacent the exposed seal, to remove the seal from the magazine.

6. In apparatus for applying initially flat folded seals to containers moving on a transfer apparatus, a first shaft, a second shaft, a source of seals; a plurality of seal applying assemblies rotatable by said second shaft and disposed to receive seals from said source, open them, and subsequently apply them to a container; a cam rotated by said first shaft, and means actuated by said cam and engageable with each assembly in succession to actuate the latter to strip a seal therefrom onto a container; said means comprising, a lever actuated by said cam, a vertically pivotable arm connected to said lever, and a roller-like member secured to the end of said arm for engagement with each assembly.

7. In apparatus for applying seals to containers, an input shaft, drive means for said shaft, a generally upright column connected to be driven by said shaft, a pair of seal applying assemblies mounted in diametrically opposed relation on said column, a cam disposed adjacent said column, and cam follower means connected to said assemblies, the surface of said cam being contoured to actuate said follower means to alternately raise and lower each said assembly during rotation of the column.

8. In apparatus for applying seals to containers, an intermittently rotating input shaft, drive means for said shaft, a generally upright column connected to be driven intermittently by said shaft so that the column dwells at every 180° of its rotation, a pair of seal applying assemblies disposed in diametrically opposed relation on said column and mounted for vertical movement thereon, a cam disposed adjacent said column, and cam follower means connected to said assemblies, the surface of said cam being contoured to actuate said follower means to alternately raise and lower each said assembly during rotation of the column.

9. The apparatus of claim 8 in which the elements are positioned to alternately dispose one of said seal applying assemblies at its uppermost position and the other assembly at its lowermost position during a dwell.

10. In apparatus for applying seals to containers, a generally upright rotary member having an axis tilted at an acute angle from the vertical, at least one seal applying assembly mounted on said member and tilted from the axis of the member, seal feed means disposed adjacent said member and tilted at an acute angle from the horizontal, container carrying means disposed adjacent said member opposite said feed means, and means to rotate said member so that said seal applying assembly will be tilted from the vertical when it is adjacent said seal feed means and will be disposed in a vertical position when it is adjacent said container carrying means.

11. In apparatus for applying seals to containers, an intermittently rotating input shaft, a generally upright shaft geared to said shaft, support means for said upright shaft, an upright column disposed concentrically about said upright shaft, a cradle member disposed at the top of said column and connecting the latter for rotation with said upright shaft, a rocker arm pivotally mounted on said cradle and connected to a pair of seal applying assemblies mounted in opposed relationship on said column, and a fixed inclined cam mounted above said rocker arm and engageable by follower means on said arm whereby rotation of said column and cradle alternately raise and lower said seal applying assemblies.

12. The apparatus of claim 11 which includes, a source of vacuum, and distributor means operable by rotation of said column for alternately shunting vacuum from one seal applying assembly to the other.

13. The apparatus of claim 12 in which said column is provided with a pair of generally upwardly extending passageways which communicate with vacuum faces in said assemblies; and said distributor means comprises, an annular member connected to said vacuum source and fixedly secured to the said support means and having an arcuate groove in the upper face thereof, and a base member secured to the lower end of said column and rotatable therewith and having a lower face engageable with said upper face, said base member having passageways disposed to communicate between said first-named passageways and said groove.

14. In aparatus for applying seals to containers, a constantly rotating input shaft, a drive shaft driven by said input shaft, an intermittently rotating input shaft, a generally upright shaft geared to the intermittent shaft, an upright column disposed concentrically about said upright shaft, a cradle member disposed at the top of said column and connecting the latter for rotation with said upright shaft, a rocker arm pivotally mounted on said cradle and connected to a pair of seal applying assemblies mounted in opposed relationship on said column, a fixed inclined cam mounted above said rocker arm and engageable by follower means on said arm whereby rotation of said column and cradle alternately raise and lower said seal applying assemblies, a source of vacuum, and valve means on said drive shaft and on said column to selectively supply vacuum to said assemblies.

15. The apparatus of claim 14 in which said valve means comprises, a valve connected to said vacuum source and sequentially actuated by said drive shaft to permit or prevent vacuum from passing therethrough, and a distributor connected between said valve and the seal applying assemblies and mounted at the lower end of said column, said distributor being constructed to shunt the vacuum connection from one assembly to the other during rotation of the column.

16. In apparatus for applying seals to containers, a motor, a constant speed shaft driven by said motor, an intermittently rotatable shaft driven by said motor, container handling means and first seal handling means actuated by the intermittent shaft, second seal handling means actuated by the constant shaft, and timing means disposed between said shafts to assure that the latter are accurately positioned relative to one another.

17. The apparatus of claim 16 in which said shafts are at right angles to each other and said intermittent shaft dwells periodically, a ring on said intermittent shaft and with said ring having at least one radial slot passing therethrough, and a cam on said constant shaft which is disposed to pass through said slot at the moment of dwell.

18. The apparatus of claim 5 which includes a spacing member disposed above said magazine and spaced from said pick-off member approximately the thickness of one folded seal to prevent removal of more than one seal at a time from the magazine.

19. The apparatus of claim 5 which includes vacuum means to secure a seal to the said member.

20. The apparatus of claim 19 in which the vacuum means comprises, a vacuum source, and a valve connected between said vacuum source and a vacuum face on said member and actuated by rotation of said first shaft to selectively provide vacuum at said face.

21. In apparatus for applying initially flat folded seals to containers moving on a transfer apparatus, a first shaft, a second shaft, a source of seals; a plurality of seal applying assemblies rotatable by said second shaft and disposed to receive seals from said source, open them, and subsequently apply them to a container; a cam rotated by said first shaft, and lever means actuated by said cam and engageable with each assembly in succession to dispose the latter in seal receiving condition and to subsequently open the seal received on the assembly.

22. The apparatus of claim 21 in which said lever means comprises, an arm actuated by said cam, and a finger mounted laterally at the end of said arm for engagement with successive assemblies.

23. The apparatus of claim 22 which includes means for mechanically biasing said finger laterally of said arm.

24. In apparatus for applying initially flat folded seals to containers moving on a transfer apparatus, a first shaft, a second shaft, a source of seals; a plurality of seal applying assemblies rotatable by said second shaft and disposed to receive seals from said source, open them, and subsequently apply them to a container; a first cam rotated by said first shaft, pick-off means actuated by said first cam for receiving a seal from said seal source and applying it to one of said assemblies, a second cam rotated by said first shaft, control means actuated by said second cam and engageable with each assembly in succession to dispose the latter in seal receiving condition and to subsequently open the seal received on the assembly from the pickoff means, a third cam rotated by said first shaft, and means actuated by said third cam and engageable with each assembly in succession to actuate the latter to strip a seal therefrom onto a container.

25. In apparatus for applying initially flat folded seals to containers moving on a transfer apparatus, a first shaft, a second shaft, a seal storage magazine disposed to present one seal at a time for pick-off; a plurality of seal applying assemblies rotatable by said second shaft and disposed to receive seals from said magazine, open them, and subsequently apply them to a container; a first cam rotated by said first shaft, a lever actuated by said first cam, a pick-off member connected to said lever and slideable laterally of said magazine adjacent the exposed seal for receiving a seal from said magazine and applying it to one of said assemblies, a vacuum source, valve means operable by rotation of said first shaft to selectively connect said vacuum source to said pick-off member to secure a seal to the latter, a second cam rotated by said first shaft, an arm actuated by said second cam, a finger mounted laterally at the end of said arm for engagement with successive assemblies to dispose the latter in seal receiving condition and to subsequently open the seal received on the assembly, a third cam rotated by said second shaft, lever means actuated by said third cam, a vertically pivotable arm connected to said lever means, and a roller-like member secured to the end of said arm for engagement with each assembly in succession to actuate the latter to strip a seal therefrom onto a container.

26. Apparatus for applying seals or the like to containers, comprising, a frame, a motor carried by said frame, a constant speed drive shaft driven by said motor, a container conveyor on said frame and driven at a constant speed by said drive shaft; a transfer table disposed above said conveyor for receiving, carrying and discharging containers on said conveyor; a seal-applying station adjacent said table, differential means connected to said motor and having an output shaft having an intermittent rotate-dwell motion, means connecting said output shaft to said table to rotate the latter; a plurality of seal handling assemblies rotatable by said output shaft in synchronism with the rotation of said table with said assemblies being constructed to receive, open and strip a seal therefrom; and control means connected for actuation by said constant speed drive shaft to operate said assemblies.

27. Apparatus for applying seals or the like to containers, comprising, a frame, a constant speed motor carried by said frame, a container conveyor carried by said frame and driven at a constant speed from said motor; a transfer table disposed above said conveyor for receiving, carrying and discharging containers on said conveyor; a seal-applying station adjacent said table, differential means connected between said motor and said table to provide an intermittent index-dwell motion thereof and with said means being disposed and constructed to provide a time ratio for index-dwell of the table of about five to one, a rotary seal applying head, a pair of seal applying members disposed diametrically on opposite sides of said head, means connecting said head to said differential means so that said head intermittently indexes through about 180° and then dwells with one of said seal applying members disposed at said station, first means driven at a constant speed by said motor to pickup a seal from a magazine and transfer it to the seal applying member, second means driven at a constant speed by said motor to open and close said seal applying member for receipt of and opening of a seal thereon, and third means driven at a constant speed by said motor to strip a seal from said said member onto a container when the member is at said station.

References Cited in the file of this patent
UNITED STATES PATENTS

| | | |
|---|---|---|
| 1,252,460 | Linderuce | Jan. 8, 1918 |
| 2,579,458 | Allen | Dec. 25, 1951 |
| 2,654,520 | Allen | Oct. 6, 1953 |
| 2,706,073 | Tracy | Apr. 12, 1955 |
| 2,835,088 | Eddison | May 20, 1958 |